US012696037B2

(12) United States Patent
Ekelund et al.

(10) Patent No.: US 12,696,037 B2
(45) Date of Patent: Jul. 28, 2026

(54) HEARING AID AND DISTANCE-SPECIFIC AMPLIFIER

(71) Applicant: Oticon A/S, Smørum (DK)

(72) Inventors: Caroline Ekelund, Smørum (DK); Michael Syskind Pedersen, Smørum (DK); Jesper Jensen, Smørum (DK); Claus Forup Corlin Jespersgaard, Smørum (DK)

(73) Assignee: Oticon A/S, Smørum (DK)

( * ) Notice: Subject to any disclaimer, the term of this patent is extended or adjusted under 35 U.S.C. 154(b) by 184 days.

(21) Appl. No.: 18/418,391

(22) Filed: Jan. 22, 2024

(65) Prior Publication Data

US 2024/0251208 A1 Jul. 25, 2024

(30) Foreign Application Priority Data

Jan. 23, 2023 (EP) .................................... 23152880

(51) Int. Cl.
*H04R 25/00* (2006.01)

(52) U.S. Cl.
CPC ....... *H04R 25/505* (2013.01); *H04R 2225/43* (2013.01); *H04R 2430/01* (2013.01)

(58) Field of Classification Search
CPC .............. H04R 25/505; H04R 2225/43; H04R 2430/01
See application file for complete search history.

(56) References Cited

U.S. PATENT DOCUMENTS

| | | | | |
|---|---|---|---|---|
| 2013/0022214 A1 | 1/2013 | Dickins et al. | | |
| 2014/0294183 A1 | 10/2014 | Lee et al. | | |
| 2015/0289063 A1* | 10/2015 | Ma | H04R 25/505 381/321 | |
| 2017/0078806 A1* | 3/2017 | Hui | H04R 25/453 | |
| 2018/0041849 A1* | 2/2018 | Farmani | H04R 25/405 | |
| 2018/0054683 A1* | 2/2018 | Pedersen | H04R 25/554 | |
| 2019/0208334 A1 | 7/2019 | Petersen et al. | | |
| 2019/0253812 A1* | 8/2019 | Gallego | H04R 25/407 | |
| 2021/0266682 A1 | 8/2021 | Fischer et al. | | |

FOREIGN PATENT DOCUMENTS

EP 4009667 6/2022

OTHER PUBLICATIONS

Direct-to-Reverberant Energy Ratio Estimation using a First order Microphone, Hanchi Chen et al., Research School of Engineering, College of Engineering and computer Science, The Australian National University, Canberra, Australia.

* cited by examiner

*Primary Examiner* — Suhan Ni

(57) ABSTRACT

Disclosed herein are embodiments of a hearing aid. The hearing aid includes an input unit configured to convert a sound in an environment of the hearing aid to at least one electrical input signal representative of the sound. The hearing aid includes a signal processor. The signal processor is configured to determine, based on the at least one electrical input signal, whether an origin of the sound is below a distance threshold. The signal processor is configured to, in accordance with the origin being below the distance threshold, attenuate the at least one electrical input signal. The signal processor is further configured to determine, based on the at least one electrical input signal, whether the origin is above a far-distance threshold, and in accordance with the origin being above the far-distance threshold, attenuate the at least one electrical input signal.

13 Claims, 11 Drawing Sheets

HEARING AID AND DISTANCE-SPECIFIC AMPLIFIER

SUMMARY

A hearing aid (e.g., a hearing instrument, hearing device, headset) is disclosed herein. In one or more aspects of the present disclosure, the hearing aid includes an input unit. The input unit is configured to convert a sound in an environment of the hearing aid to at least one electrical input signal representative of the sound. The hearing aid includes a signal processor. The signal processor is configured to determine, based on the at least one electrical input signal, whether an origin of the sound is below a distance threshold. The signal processor is configured to, in accordance with the origin being below the distance threshold, attenuate the at least one electrical input signal.

Advantageously, aspects of the disclosed hearing aid can attenuate unwanted noise and/or sound while maintaining (e.g., not-attenuating) and/or amplifying desired noise and/or sounds. In particular, the disclosed hearing aid can attenuate noise that is very near to the hearing aid. Typical "close range" noises can include glasses bumping against the hearing aid, a pillow pressing against the hearing aid, etc., which are noises that are not desirable to hear for a user, especially at amplified levels. In addition, aspects of the disclosed hearing aid can alleviate unnatural or strange sounds from a user's own voice. Further, aspects of the disclosed hearing aid can improve speech intelligibility. For example, in certain implementations the hearing aid can improve speech intelligibility by attenuating unwanted sound originating far from the hearing aid, such as in a restaurant.

A hearing aid (e.g., a hearing instrument, hearing device, headset) is disclosed herein. In one or more aspects of the present disclosure, the hearing aid includes an input unit. The input unit is configured to convert a sound in an environment of the hearing aid to at least one electrical input signal representative of the sound. The hearing aid includes a signal processor. The signal processor is configured to determine, based on the at least one electrical input signal, whether the origin is above a far-distance threshold. The signal processor is configured to, in accordance with the origin being above the far-distance threshold, attenuate the at least one electrical input signal.

A hearing aid (e.g., a hearing instrument, hearing device, headset) is disclosed herein. In one or more aspects of the present disclosure, the hearing aid includes an input unit. The input unit is configured to convert a sound in an environment of the hearing aid to at least one electrical input signal representative of the sound. The hearing aid includes a signal processor. The signal processor is configured to determine, based on the at least one electrical input signal, whether an origin of the sound is below a distance threshold and, in accordance with the origin being below the distance threshold, attenuate the at least one electrical input signal and/or the signal processor is configured to determine, based on the at least one electrical input signal, whether the origin is above a far-distance threshold and in accordance with the origin being above the far-distance threshold, attenuate the at least one electrical input signal.

In the present context, a hearing aid, e.g. a hearing instrument, can refer to a device which is adapted to improve, augment and/or protect the hearing capability of a user by receiving an acoustic signal from a user's surrounding. The hearing aid may be adapted to provide a frequency dependent gain and/or a level dependent compression and/or a transposition (with or without frequency compression) of one or more frequency ranges to one or more other frequency ranges, e.g. to compensate for a hearing impairment of a user. The hearing aid may comprise a signal processor for enhancing the input signals and providing a processed output signal.

The hearing aid may comprise an input unit configured to convert a sound in an environment of the hearing aid to at least one electrical input signal representative of the sound. In other words, the input unit can be configured for providing an electric input signal representing sound. The input unit may comprise an input transducer, e.g. a microphone, for converting an input sound to an electric input signal. The input unit may comprise a wireless receiver for receiving a wireless signal comprising or representing sound and for providing an electric input signal representing said sound.

The hearing aid may comprise a directional microphone system (which can be part or all of the input unit) adapted to spatially filter sounds from the environment, and thereby enhance a target acoustic source among a multitude of acoustic sources in the local environment of the user wearing the hearing aid. The directional system may be adapted to detect (such as adaptively detect) from which direction a particular part of the microphone signal originates. This can be achieved in various different ways as e.g. described in the prior art. In hearing aids, a microphone array beamformer is often used for spatially attenuating background noise sources. The beamformer may comprise a linear constraint minimum variance (LCMV) beamformer. Many beamformer variants can be found in literature. The minimum variance distortionless response (MVDR) beamformer is widely used in microphone array signal processing. Ideally the MVDR beamformer keeps the signals from the target direction (also referred to as the look direction) unchanged, while attenuating sound signals from other directions maximally. The generalized sidelobe canceller (GSC) structure is an equivalent representation of the MVDR beamformer offering computational and numerical advantages over a direct implementation in its original form.

The hearing aid can comprise a signal processor. The signal processor can be configured to perform certain actions and/or to provide data regarding other components of the hearing aid performing certain actions. The signal processor can be configured to determine, based on the at least one electrical input signal, whether an origin of the sound is below a distance threshold. The signal processor can, in accordance with the origin being below the distance threshold, attenuate the at least one electrical input signal. For example, the signal processor can be configured to compare the origin with the distance threshold.

The origin of the sound can be a location in the environment from which the sound originates from. Accordingly, this may be understood as the location of where the sound begins. The sound can be, for example, a noise, ambient noise, speech, music, etc., and the particular sound is not limiting. The input unit can be configured to receive and/or obtain said sound, such as at a distance apart from the origin.

In one or more examples or embodiments, the signal processor is configured to determine a general location of the origin of the sound, as in whether or not the origin is below, above, or is equal to the distance threshold. For example, the signal processor may not need to determine the exact location of the origin of the sound, but merely whether the origin is below, equal to, or above the distance threshold.

In some examples, the signal processor is configured to determine the exact location of the origin with respect to the hearing aid. In one or more examples, the signal processor can be configured to determine a distance of the origin from the hearing aid. For example, to determine whether the origin of the sound is below a distance threshold includes to determine whether the distance is below the distance threshold.

In one or more examples, in accordance with the distance being below the distance threshold, the signal processor is configured to attenuate the at least one electrical input signal based on the difference between the distance threshold and the distance. For example, the signal processor can apply a different attenuation for differences in the distance threshold and the distance. In accordance with the distance being close to the distance threshold, the signal processor is configured to apply a first attenuation. In accordance with the distance being farther from the distance threshold, the signal processor is configured to apply a second attenuation which is greater than the first attenuation. In other words, the closer the distance is to the hearing aid, the more attenuation is applied by the signal processor. The same approach can be performed with the far-distance threshold, in particular the distance being beyond the far-distance threshold, discussed below. The attenuation may be linearly related to the distance from the distance threshold. However, other relationships can be used as well.

As used herein, the at least one electrical input signal representative of the sound can be modifiable, such as by the signal processor and/or via other components at the direction of the signal processor. By modifying the electrical input signal, any output, such as an auditory signal, based on the electrical input signal can be modified as well. For example, a gain can be applied to the at least one electrical input signal, leading to increased volume of the auditory signal based on the at least one electrical input signal. As another example, attenuation of the at least one electrical input signal can lead to reduced or eliminated sound of the auditory signal based on the at least one electrical input signal. The at least one electrical input signal may undergo processing in the hearing aid, such as via the signal processor.

As used herein, attenuate can include one or more of reducing, eliminating, filtering, diminishing, and muting the at least one electrical input signal. Attenuate can include partial and/or full attenuation of the at least one electrical input signal. Attenuation can include attenuating certain frequencies and not attenuating other frequencies. Attenuation can include changing the compression ratio. In other words, the signal processor is configured to attenuate the at least one electrical input signal so that any output of the at least one electrical signal is attenuated. Attenuating can include providing a processed output signal that has been attenuated. For example, any auditory signal based on the at least one electrical signal may be attenuated. Therefore, a user of the hearing aid would hear the at least one electrical signal at a reduced (such as muted and/or eliminated) volume as compared to an un-attenuated signal. The signal processor can be configured to attenuate the at least one electrical input signal. The signal processor can provide data instructing an attenuator of the hearing aid to attenuate the at least one electrical input signal.

The distance threshold can be understood as representative of a particular distance from the hearing aid. The distance threshold may be an area around the hearing aid. The distance threshold can be considered a boundary around the hearing aid. The distance threshold can be understood as a particular distance from both hearing aids, such as if a user is using more than one hearing aid. The distance threshold can be (e.g., be representative of) circular and/or ovaloid, such as being the particular distance in all directions from the hearing aid. Other shapes can be used as well. In certain examples, the distance threshold can vary depending on directionality. The distance threshold may be other polygons as well, such as squares, rectangles, etc. In some examples, the distance threshold may not be circular, but can instead vary based on the direction from the hearing aid. For example, the distance threshold may have a first distance in a first direction, and a second distance different than the first distance in the opposite direction. In one or more examples, the distance threshold can be only in particular directions from the hearing aid, such as an arc of 75 degrees in front of the user of the hearing aid. The distance threshold can be used separate from or in conjunction with a far-distance threshold, discussed in detail below.

The distance threshold can be a near-distance threshold. Accordingly, sounds having an origination below the distance threshold can be attenuated, as these noises are typically not useful to a user of a hearing aid. For example, origins being below the distance threshold may be the clinking of glasses worn by the user, or the hearing aid contacting a surface. It can be beneficial to a user of the hearing aid that these types of noises are attenuated. This may be particularly advantageous as tapping of the hearing aid can be used to implement certain features of the hearing aid (e.g., single tapping, double tapping, etc.) This tapping may lead to undesirable sounds for the user, and therefore can be attenuated in accordance with this disclosure.

In one or more examples, the distance threshold is 1.5 cm from the hearing aid. For example the distance threshold can be less than 1.5 cm from the hearing aid. The distance threshold can be 1.4, 1.3, 1.2, 1.1, 1.0, 0.9, 0.8, 0.7, 0.6, 0.5, 0.4, 0.3, 0.2, or 0.1 cm from the hearing aid.

Most sound signal sources (except the user's own voice) are located far away from the user compared to dimensions of the hearing aid, e.g. a distance $d_{mic}$ between two microphones of a directional system. A typical microphone distance in a hearing aid is of the order 10 mm. A minimum distance of a sound source of interest to the user (e.g. sound from the user's mouth or sound from an audio delivery device) is of the order of 0.1 m (>10 $d_{mic}$). For such minimum distances, the hearing aid (microphones) would be in the acoustic near-field of the sound source and a difference in level of the sound signals impinging on respective microphones may be significant. A typical distance for a communication partner is more than 1 m (>100 $d_{mic}$). The hearing aid (microphones) would be in the acoustic far-field of the sound source and a difference in level of the sound signals impinging on respective microphones is insignificant. The difference in time of arrival of sound impinging in the direction of the microphone axis (e.g. the front or back of a normal hearing aid) is $\Delta T = d_{mic}/v_{sound} = 0.01/343$ [s]=29 μs, where $v_{sound}$ is the speed of sound in air at 20° C. (343 m/s).

In some examples, to determine whether the origin is below the distance threshold comprises applying one or more of an inter microphone difference, a frequency analysis, a wind noise detection, and an own voice detection.

For example, the hearing aid, such as the signal processor, can utilize inter microphone distance for determining whether the origin is below the distance threshold. This can typically be used with a dual-hearing aid system (e.g., binaural). If a specific sound is only present in one hearing aid of the user, the level and signal-to-noise difference between the two hearing aids will be unnaturally high so that the hearing aid would detect a near field event and temporarily stream sound from the other microphone. For example, if a first hearing aid obtains a sound but the second hearing aid does not obtain the same sound, the signal processor can be configured to determine that the origin of the sound is below the distance threshold. The signal processor can be configured to attenuate such a sound. In one or more examples, the signal processor can be configured to attenuate the nearfield sound as presenting the contralateral sound may require a low-latency binaural audio link.

The signal processor can be configured to apply a frequency analysis to the sound and/or the at least one electrical input signal. For example, sounds in a particular frequency can be determined by the signal processor as an origin of the sound being below the distance threshold. This can be advantageous as sounds like glasses bumping against the hearing aid have a very specific frequency spectrum. Common near-field event frequencies can be stored by the signal processor (e.g., by memory in the hearing aid accessibly by the signal processor) in order to attenuate them. In some iterations, the signal processor does not need to determine the actual origin of the sound using frequency analysis. In certain embodiments, the signal processor contains a near field event detector, such as for determining the distance threshold. The near field event detector may be implemented by use of a neural network trained on examples of near field event sounds.

In one or more examples, the signal processor can be configured to apply wind noise detection. In accordance with the signal processor determining that the sound (and/or the at least one electrical input signal) is indicative of noise, the signal processor can be configured to determine that the origin of the sound is below the distance threshold. In accordance with the signal processor determining that the sound (and/or the at least one electrical input signal) is not indicative of noise, the signal processor can be configured to not determine that the origin of the sound is below the distance threshold.

In certain examples, the signal processor can be configured to determine whether the sound is the user's own voice. In accordance with determining that the sound is the user's own voice, the signal process is configured to determine that the origin of the sound is below the threshold. Hearing aid users sometimes report finding their own voice boomy or loud when fitted with new hearing aids or when the gain in their current hearing aids is adjusted. In some examples, the signal processor is configured to apply a slight attenuation to the at least one electrical input signal representative of the user's own voice to make it less loud to the user. In some cases, the signal processor is configured to attenuate certain frequencies, such as low frequencies. In one or more examples, the attenuation can be very slight to prevent the user's voice from sounding unnaturally low to them (causing to talk abnormally loudly). Also, certain users eventually acclimatize to the sound of their own voice, so this attenuation could even be gradually lifted over a certain time period after new settings are programmed to the hearing aids by the HCP.

In one or more examples, the hearing aid can include one or more sensors. For example, the one or more sensors can include motion sensors and/or accelerometers. In accordance with the one or more sensors being indicative of movement by the user, the signal processor can determine that the origin of the sound is below the distance threshold. This may advantageously attenuate chewing, tapping, touching, etc.

The signal processor can, in accordance with the origin being equal to or above the distance threshold, the signal processor is configured to apply an amplification to the at least one electrical input signal via an amplifier. The signal processor can, in accordance with the origin being equal to or above the distance threshold, the signal processor is configured to not attenuate the at least one electrical input signal.

In other words, the signal processor can be configured to amplify and/or provide instructions to the amplifier to amplify the at least one electrical input signal. Amplification can include applying a gain. For example, a user would experience an auditory signal output by the hearing aid at a louder volume than what the user would normally hear. The amplified signal can be a processed output signal from the signal processor. In certain examples, the signal processor may be configured to not attenuate the at least one electrical input signal, allowing the user to hear the auditory signal as they normally would. In this instance, only close sounds would be attenuated, thereby enhancing the auditory signal.

The hearing aid may comprise a 'forward' (or 'signal') path for processing an audio signal between an input and an output of the hearing aid. A signal processor may be located in the forward path. The signal processor may be adapted to provide a frequency dependent gain to the at least one electrical input signal according to a user's particular needs (e.g. hearing impairment). The hearing aid may comprise an 'analysis' path comprising functional components for analyzing signals and/or controlling processing of the forward path. Some or all signal processing of the analysis path and/or the forward path may be conducted in the frequency domain, in which case the hearing aid comprises appropriate analysis and synthesis filter banks. Some or all signal processing of the analysis path and/or the forward path may be conducted in the time domain.

In certain examples, the signal processor can be configured to determine, based on the at least one electrical input signal, whether the origin is above a far-distance threshold. In one or more examples, in accordance with the origin being above the far-distance threshold, attenuate the at least one electrical input signal.

The signal processor can be configured to determine whether the origin is above a far-distance threshold instead of determining whether the origin is below a distance threshold as-discussed above. The signal processor can be configured to determine whether the origin is above a far-distance threshold in conjunction with determining whether the origin is below a distance threshold as-discussed above. Accordingly, the hearing aid, such as the signal processor, is configured to use the distance threshold and/or the far-distance threshold for attenuating the at least one electrical signal. The above-discussion related to the distance threshold can apply to the far-distance threshold in certain examples. Further, discussion related to the distance threshold may equally apply to the far-distance threshold in certain embodiments.

The far-distance threshold can be understood as representative of a particular distance from the hearing aid. The far-distance threshold may be an area around the hearing aid. The far-distance threshold can be considered a boundary around the hearing aid. The far-distance threshold can be understood as a particular distance from both hearing aids, such as if a user is using more than one hearing aid. The far-distance threshold can be (e.g., be representative of) circular and/or ovaloid, such as being the particular distance in all directions from the hearing aid. Other shapes can be used as well. In certain examples, the far-distance threshold can vary depending on directionality. The far-distance threshold may be other polygons as well, such as squares, rectangles, etc. In some examples, the far-distance threshold may not be circular, but can instead vary based on the direction from the hearing aid. For example, the far-distance threshold may have a first distance in a first direction, and a second distance different than the first distance in the opposite direction. In one or more examples, the far-distance threshold can be only in particular directions from the hearing aid, such as an arc of 75 degrees in front of the user of the hearing aid.

Advantageously, sounds having an origination above the far-distance threshold can be attenuated, as these noises are typically not useful to a user of a hearing aid.

The far-distance threshold may be different from the distance threshold. The far-distance threshold may be spaced apart from the distance threshold. The far-distance threshold may encompass the distance threshold. The far-distance threshold may be farther from the hearing aid than the distance threshold. In some examples, the far-distance threshold can be 1, 2, 2.5, 3, 4, 5, 6, 7, 8, 9, or 10 meters from the hearing aid. In some examples, the far-distance threshold can be at least 1, 2, 2.5, 3, 4, 5, 6, 7, 8, 9, or 10 meters from the hearing aid.

The far-distance threshold may vary depending on whether the audio is in front or behind the user. The far-distance threshold may vary depending on room size, such as the amount of reverberation. In certain examples, the far-distance threshold can be implemented using a neural network trained on sounds exemplifying far-field and non-far field sound scenes. The neural network input features may e.g. be the microphone audio signals, or derived features such as direction of arrival, sound level, amount of reverberation or location (inside/outside).

In one or more examples, to determine whether the origin is above the far-distance threshold includes applying one or more of a direct to reverberant ratio (DRR), a difference in sound level between microphones of the hearing aid, and a noise reduction algorithm. In one or more examples, to determine whether the origin is above the far-distance threshold includes applying a clarity index, such as $C_{50}$.

In one or more examples, to determine whether the origin is above the far-distance threshold includes applying a DRR or a C50 with an estimation of the room reverberation time. In one or more example methods, the method can include determining an estimation of the room reverberation time. The room reverberation time can be seen as a parameter characterizing the room, and is indicative of how fast an impulse response tail decades. In other words, the room reverberation time can be seen as indicative of how many seconds it takes for the room impulse response (RIR) to decrease by a certain dB, such as 30 dB or 60 dB.

For example, the signal processor may be configured to determine whether a direct to reverberant ratio is above a reverb threshold. The reverb threshold may be an estimation of reverberation. For example, the reverb threshold may be an estimated amount of reverberation of T30 or T60 (e.g., the time it takes for the reverberation to decrease by 30 or 60 dB, respectively). The reverb threshold may be a set threshold. The reverb threshold can be indicative of a particular distance of the origin of the sound based on relative sound intensity. In accordance with the signal processor determining that the sound (and/or the at least one electrical input signal) is above the reverb threshold, the signal processor is configured to determine that the origin is above the far-distance threshold. In accordance with the signal processor determining that the sound (and/or the at least one electrical input signal) is equal to or below the reverb threshold, the signal processor is configured to determine that the origin is not above the far-distance threshold.

In one or more examples, the hearing aid can include a plurality of microphones. For example, a single hearing aid can include a plurality of microphones. In some examples, two hearing aids can be used, each one having a microphone. The signal processor is configured to determine a difference in sound level between microphones of the hearing aid. A larger difference can be indicative of the origin being farther away from the hearing aid. In accordance with the difference being above a distance threshold, the signal processor is configured to determine that the origin is above the far-distance threshold. In accordance with the difference being equal to or below a distance threshold, the signal processor is configured to determine that the origin is not above the far-distance threshold.

In one or more examples, the signal processor can use a noise reduction algorithm to estimate sources within a certain range. As part of a directional noise reduction algorithm, the signal processor can be configured to estimate a target cancelling beamformer. The target cancelling beamformer may be most efficient at attenuating the origin, when the origin is impinging from a preferred direction. Also, to some extend the target cancelling beamformer performance can be distance-dependent.

In one or more examples or embodiments, the signal processor can apply a neural network (e.g., the output of a neural network) for determination of the far-distance threshold.

In one or more examples, in accordance with the origin being equal to or below the far-distance threshold and being equal to or above the distance threshold, the signal processor is configured to not-attenuate the at least one electrical input signal. For example, if the origin is located between the distance threshold and the far-distance threshold, the signal processor is configured to not attenuate the at least one electrical input signal. If the origin is located between the distance threshold and the far-distance threshold, the signal processor is configured to amplify the at least one electrical input signal.

In certain examples, the hearing aid is configured to receive user input. In some examples, the signal processor is configured to adjust the distance threshold and/or the far-distance threshold based on the user input.

In one or more examples or embodiments, the hearing aid is a binaural hearing aid. The distance threshold and/or the far distance threshold can be determined based on electrical input signals received from each of the hearing aids.

In one or more examples or embodiments, the hearing aid can include a wireless receiver and/or a transmitter. The wireless receiver and/or transmitter may e.g. be configured to receive and/or transmit an electromagnetic signal in the radio frequency range (3 kHz to 300 GHz).

The wireless receiver and/or transmitter may e.g. be configured to receive and/or transmit an electromagnetic signal in a frequency range of light (e.g. infrared light 300 GHz to 430 THz, or visible light, e.g. 430 THz to 770 THz).

The hearing aid may comprise antenna and transceiver circuitry allowing a wireless link to an entertainment device (e.g. a TV-set), a communication device (e.g. a telephone), a mobile device, a wireless microphone, or another hearing aid, etc. The hearing aid may thus be configured to wirelessly receive a direct electric input signal from another device, such as user input. Likewise, the hearing aid may be configured to wirelessly transmit a direct electric output signal to another device. The direct electric input or output signal may represent or comprise an audio signal and/or a control signal and/or an information signal.

In general, a wireless link established by antenna and transceiver circuitry of the hearing aid can be of any type. The wireless link may be a link based on near-field communication, e.g. an inductive link based on an inductive coupling between antenna coils of transmitter and receiver parts. The wireless link may be based on far-field, electromagnetic radiation. Preferably, frequencies used to establish a communication link between the hearing aid and the other device is below 70 GHz, e.g. located in a range from 50 MHz to 70 GHz, e.g. above 300 MHz, e.g. in an ISM range above 300 MHz, e.g. in the 900 MHz range or in the 2.4 GHz range or in the 5.8 GHz range or in the 60 GHz range (ISM=Industrial, Scientific and Medical, such standardized ranges being e.g. defined by the International Telecommunication Union, ITU). The wireless link may be based on a standardized or proprietary technology. The wireless link may be based on Bluetooth technology (e.g. Bluetooth Low-Energy technology), or Ultra WideBand (UWB) technology.

The hearing aid may be or form part of a portable (i.e. configured to be wearable) device, e.g. a device comprising a local energy source, e.g. a battery, e.g. a rechargeable battery. The hearing aid may e.g. be a low weight, easily wearable, device, e.g. having a total weight less than 100 g, such as less than 20 g.

For example, the hearing aid is configured to receive user input from a mobile device, such as via an application. The hearing aid can be configured to receive user input via one or more sources, such as computers, tablets, voice commands, fitting software, etc. The application can include an interface. The interface can allow a user to change the distance threshold and/or the far-distance threshold. For example, the user input can be indicative of the user wanting the distance threshold to be closer to the hearing aid. The signal processor can be configured to receive said user input and adjust the distance threshold to the new distance threshold as indicated by the user input.

The user input can be from a user of the hearing aid. The user input can be from a fitting technician. The particular person providing user input is not limiting.

As used herein, adjusting the distance threshold and/or the far-distance threshold can include changing a distance the distance threshold and/or the far-distance. For example, the signal processor can be configured to increase or decrease the distance threshold and/or the far distance threshold from the hearing aid. Adjusting the distance threshold and/or the far-distance threshold can include changing a shape of the distance threshold and/or the far-distance threshold.

In certain implementations, the hearing aid is configured to enable and/or disable the distance threshold. In one or more examples, the signal processor is configured to receive user input indicative of one of enabling and/or disabling the distance threshold. In certain implementations, the hearing aid is configured to enable and/or disable the far-distance threshold. In one or more examples, the signal processor is configured to receive user input indicative of one of enabling and/or disabling the far-distance threshold.

For example, a user may be able to enable and/or disable one or both of the distance threshold and the far-distance threshold via user input obtained by the signal processor. In certain examples, the signal processor obtains user input indicative of either enabling or disabling the distance threshold and/or the far distance threshold directly. In certain instances, a user is able to select different programs (e.g., plans, settings, modes) for the hearing aid. Certain programs may enable and/or disable the distance threshold and/or the far distance. As an example, the signal processor may receive user input indicative of a "nature-walk" program. The "nature-walk" program may be indicative of disabling the far-distance threshold, thus providing the user ambient noises that are normally attenuated.

The hearing aid may be configured to operate in different modes, e.g. a normal mode and one or more specific modes, e.g. selectable by a user, or automatically selectable. A mode of operation may be optimized to a specific acoustic situation or environment, e.g. a communication mode, such as a telephone mode. A mode of operation may include a low-power mode, where functionality of the hearing aid is reduced (e.g. to save power), e.g. to disable wireless communication, and/or to disable specific features of the hearing aid.

In some examples, the hearing aid is configured to enable and/or disable the distance threshold and/or the far-distance threshold automatically.

In one or more examples, the signal processor is configured to determine if the at least one electrical input signal is indicative of speech. In some examples, in accordance with the at least one electrical input signal being indicative of speech, the signal processor is configured to enable the distance threshold. In some examples, in accordance with the at least one electrical input signal not being indicative of speech, the signal processor is configured to not enable the distance threshold. In some examples, in accordance with the at least one electrical input signal being indicative of speech, the signal processor is configured to enable the far-distance threshold. In some examples, in accordance with the at least one electrical input signal not being indicative of speech, the signal processor is configured to not enable the far-distance threshold.

For example, the hearing aid may comprise a voice activity detector (VAD) for estimating whether or not (or with what probability at least one electrical input signal comprises a voice signal (at a given point in time). A voice signal may in the present context be taken to include a speech signal from a human being. It may also include other forms of utterances generated by the human speech system (e.g. singing). The voice activity detector unit may be adapted to classify a current acoustic environment of the user as a VOICE or NO-VOICE environment. This has the advantage that time segments of the electric microphone signal comprising human utterances (e.g. speech) in the user's environment can be identified, and thus separated from time segments only (or mainly) comprising other sound sources (e.g. artificially generated noise). The voice activity detector may be adapted to detect as a VOICE also the user's own voice. Alternatively, the voice activity detector may be adapted to exclude a user's own voice from the detection of a VOICE.

Advantageously, the hearing aid may be configured to automatically enable the distance threshold and/or the far-distance threshold when the signal processor determines that the electrical input signal is indicative of speech. This can improve the ability of the user of the hearing aid to hear the speech.

In one or more examples, the hearing aid further includes an output unit. The output unit can be configured to output, based on the at least one electrical input signal, an auditory signal. For example, the output unit can be configured to output the auditory signal with any applied attenuation and/or amplification. The output unit can be a speaker.

The output unit can be configured for providing a stimulus perceived by the user as an acoustic signal based on a processed electric signal. The output unit may comprise a number of electrodes of a cochlear implant (for a CI type hearing aid) or a vibrator of a bone conducting hearing aid. The output unit may comprise an output transducer. The output transducer may comprise a receiver (loudspeaker) for providing the stimulus as an auditory (e.g., acoustic) signal to the user (e.g. in an acoustic (air conduction based) hearing aid). The output transducer may comprise a vibrator for providing the stimulus as mechanical vibration of a skull bone to the user (e.g. in a bone-attached or bone-anchored hearing aid). The output unit may (additionally or alternatively) comprise a transmitter for transmitting sound picked up-by the hearing aid to another device, e.g. a far-end communication partner (e.g. via a network, e.g. in a telephone mode of operation, or in a headset configuration).

In one or more examples, the hearing aid is constituted by or comprising an air-conduction type hearing aid, a bone-conduction type hearing aid, a cochlear implant type hearing aid, or a combination thereof. The particular type of hearing aid is not limiting, and additional types of hearing aids can be used interchangeably.

An analogue electric signal representing an acoustic signal may be converted to a digital audio signal in an analogue-to-digital (AD) conversion process, where the analogue signal is sampled with a predefined sampling frequency or rate $f_s$, $f_s$ being e.g. in the range from 8 kHz to 48 kHz (adapted to the particular needs of the application) to provide digital samples $x_n$ (or x[n]) at discrete points in time $t_n$ (or n), each audio sample representing the value of the acoustic signal at $t_n$ by a predefined number $N_b$ of bits, $N_b$ being e.g. in the range from 1 to 48 bits, e.g. 24 bits. Each audio sample is hence quantized using $N_b$ bits (resulting in $2^{Nb}$ different possible values of the audio sample). A digital sample x has a length in time of $1/f_s$, e.g. 50 μs, for $f_s$=20 kHz. A number of audio samples may be arranged in a time frame. A time frame may comprise 64 or 128 audio data samples. Other frame lengths may be used depending on the practical application.

The hearing aid may comprise an analogue-to-digital (AD) converter to digitize an analogue input (e.g. from an input transducer, such as a microphone) with a predefined sampling rate, e.g. 20 kHz. The hearing aids may comprise a digital-to-analogue (DA) converter to convert a digital signal to an analogue output signal, e.g. for being presented to a user via an output transducer.

The hearing aid, e.g. the input unit, and or the antenna and transceiver circuitry may comprise a transform unit for converting a time domain signal to a signal in the transform domain (e.g. frequency domain or Laplace domain, etc.). The transform unit may be constituted by or comprise a TF-conversion unit for providing a time-frequency representation of an input signal. The time-frequency representation may comprise an array or map of corresponding complex or real values of the signal in question in a particular time and frequency range. The TF conversion unit may comprise a filter bank for filtering a (time varying) input signal and providing a number of (time varying) output signals each comprising a distinct frequency range of the input signal. The TF conversion unit may comprise a Fourier transformation unit (e.g. a Discrete Fourier Transform (DFT) algorithm, or a Short Time Fourier Transform (STFT) algorithm, or similar) for converting a time variant input signal to a (time variant) signal in the (time-)frequency domain. The frequency range considered by the hearing aid from a minimum frequency $f_{min}$ to a maximum frequency $f_{max}$ may comprise a part of the typical human audible frequency range from 20 Hz to 20 kHz, e.g. a part of the range from 20 Hz to 12 kHz. Typically, a sample rate $f_s$ is larger than or equal to twice the maximum frequency $f_{max}$, $f_s \geq 2f_{max}$. A signal of the forward and/or analysis path of the hearing aid may be split into a number NI of frequency bands (e.g. of uniform width), where NI is e.g. larger than 5, such as larger than 10, such as larger than 50, such as larger than 100, such as larger than 500, at least some of which are processed individually. The hearing aid may be adapted to process a signal of the forward and/or analysis path in a number NP of different frequency channels (NP≤NI). The frequency channels may be uniform or non-uniform in width (e.g. increasing in width with frequency), overlapping or non-overlapping.

The hearing aid may comprise an acoustic (and/or mechanical) feedback control (e.g. suppression) or echo-cancelling system. Adaptive feedback cancellation has the ability to track feedback path changes over time. It is typically based on a linear time invariant filter to estimate the feedback path, but its filter weights are updated over time. The filter update may be calculated using stochastic gradient algorithms, including some form of the Least Mean Square (LMS) or the Normalized LMS (NLMS) algorithms. They both have the property to minimize the error signal in the mean square sense with the NLMS additionally normalizing the filter update with respect to the squared Euclidean norm of some reference signal.

The hearing aid may further comprise other relevant functionality for the application in question, e.g. compression, noise reduction, etc.

The hearing aid may comprise a hearing instrument, e.g. a hearing instrument adapted for being located at the ear or fully or partially in the ear canal of a user, e.g. a headset, an earphone, an ear protection device or a combination thereof. A hearing system may comprise a speakerphone (comprising a number of input transducers and a number of output transducers, e.g. for use in an audio conference situation), e.g. comprising a beamformer filtering unit, e.g. providing multiple beamforming capabilities.

Use:

In an aspect, use of a hearing aid as described above, in the 'detailed description of embodiments' and in the claims, is moreover provided. Use may be provided in a system comprising one or more hearing aids (e.g. hearing instruments), headsets, earphones, active ear protection systems, etc., e.g. in handsfree telephone systems, teleconferencing systems (e.g. including a speakerphone), public address systems, karaoke systems, classroom amplification systems, etc.

A Method:

In an aspect, a method of operating a hearing aid is furthermore provided by the present application. The method includes obtaining a sound in an environment. The method includes converting the sound into at least one electrical input signal representative of the sound. The method includes determining, based on the at least one electrical input signal, whether an origin of the sound is below a distance threshold. The method includes in accordance with the origin being below the distance threshold, attenuating the at least one electrical input signal.

In an aspect, a method of operating a hearing aid is furthermore provided by the present application. The method includes obtaining a sound in an environment. The method includes converting the sound into at least one electrical input signal representative of the sound. The method includes determining, based on the at least one electrical input signal, whether an origin of the sound is above a far-distance threshold. The method includes in accordance with the origin being above the far-distance threshold, attenuating the at least one electrical input signal.

In an aspect, a method of operating a hearing aid is furthermore provided by the present application. The method includes obtaining a sound in an environment. The method includes converting the sound into at least one electrical input signal representative of the sound. The method includes determining, based on the at least one electrical input signal, whether an origin of the sound is below a distance threshold and, in accordance with the origin being below the distance threshold, attenuating the at least one electrical input signal and/or the method includes determining, based on the at least one electrical input signal, whether an origin of the sound is above a far-distance threshold and, accordance with the origin being above the far-distance threshold, attenuating the at least one electrical input signal.

It is intended that some or all of the structural features of the hearing aid described above, in the 'detailed description of embodiments' or in the claims can be combined with embodiments of the method, when appropriately substituted by a corresponding process and vice versa. Embodiments of the method have the same advantages as the corresponding hearing aid(s).

A Computer Readable Medium or Data Carrier:

In an aspect, a tangible computer-readable medium (a data carrier) storing a computer program comprising program code means (instructions) for causing a data processing system (a computer) to perform (carry out) at least some (such as a majority or all) of the (steps of the) method described above, in the 'detailed description of embodiments' and in the claims, when said computer program is executed on the data processing system is furthermore provided by the present application.

By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, includes compact disc (CD), laser disc, optical disc, digital versatile disc (DVD), floppy disk and Blu-ray disc where disks usually reproduce data magnetically, while discs reproduce data optically with lasers. Other storage media include storage in DNA (e.g. in synthesized DNA strands). Combinations of the above should also be included within the scope of computer-readable media. In addition to being stored on a tangible medium, the computer program can also be transmitted via a transmission medium such as a wired or wireless link or a network, e.g. the Internet, and loaded into a data processing system for being executed at a location different from that of the tangible medium.

For example, a tangible computer-readable medium can store a computer program comprising program code means for causing a data processing system to obtain a sound in an environment. A tangible computer-readable medium can store a computer program comprising program code means for causing a data processing system to convert the sound into at least one electrical input signal representative of the sound. A tangible computer-readable medium can store a computer program comprising program code means for causing a data processing system to determine, based on the at least one electrical input signal, whether an origin of the sound is below a distance threshold. A tangible computer-readable medium can store a computer program comprising program code means for causing a data processing system to, in accordance with the origin being below the distance threshold, attenuate the at least one electrical input signal A Computer Program:

A computer program (product) comprising instructions which, when the program is executed by a computer, cause the computer to carry out (steps of) the method described above, in the 'detailed description of embodiments' and in the claims is furthermore provided by the present application. For example, the computer program can include instructions which, when the program is executed by a computer, cause the computer to carry out obtaining a sound in an environment. The computer program can include instructions which, when the program is executed by a computer, cause the computer to carry out converting the sound into at least one electrical input signal representative of the sound. The computer program can include instructions which, when the program is executed by a computer, cause the computer to carry out determining, based on the at least one electrical input signal, whether an origin of the sound is below a distance threshold. The computer program can include instructions which, when the program is executed by a computer, cause the computer to carry out, in accordance with the origin being below the distance threshold, attenuating the at least one electrical input signal.

A Data Processing System:

In an aspect, a data processing system comprising a processor and program code means for causing the processor to perform at least some (such as a majority or all) of the steps of the method described above, in the 'detailed description of embodiments' and in the claims is furthermore provided by the present application. For example, the data processing system can include a processor and program code means for causing the processor to perform obtaining a sound in an environment. The data processing system can include a processor and program code means for causing the processor to perform converting the sound into at least one electrical input signal representative of the sound. The data processing system can include a processor and program code means for causing the processor to perform determining, based on the at least one electrical input signal, whether an origin of the sound is below a distance threshold. The data processing system can include a processor and program code means for causing the processor to perform, in accordance with the origin being below the distance threshold, attenuating the at least one electrical input signal.

A Hearing System:

In a further aspect, a hearing system comprising a hearing aid as described above, in the 'detailed description of embodiments', and in the claims, AND an auxiliary device is moreover provided.

The hearing system may be adapted to establish a communication link between the hearing aid and the auxiliary device to provide that information (e.g. control and status signals, possibly audio signals) can be exchanged or forwarded from one to the other.

The auxiliary device may comprise a remote control, a smartphone, mobile device, or other portable or wearable electronic device, such as a smartwatch or the like. The hearing aid may be configured to receive user input from the auxiliary device.

The auxiliary device may be constituted by or comprise a remote control for controlling functionality and operation of the hearing aid(s). The function of a remote control may be implemented in a smartphone, the smartphone possibly running an APP allowing to control the functionality of the audio processing device via the smartphone (the hearing aid(s) comprising an appropriate wireless interface to the smartphone, e.g. based on Bluetooth or some other standardized or proprietary scheme).

The auxiliary device may be constituted by or comprise an audio gateway device adapted for receiving a multitude of audio signals (e.g. from an entertainment device, e.g. a TV or a music player, a telephone apparatus, e.g. a mobile telephone or a computer, e.g. a PC) and adapted for selecting and/or combining an appropriate one of the received audio signals (or combination of signals) for transmission to the hearing aid.

The auxiliary device may be constituted by or comprise another hearing aid. The hearing system may comprise two hearing aids adapted to implement a binaural hearing system, e.g. a binaural hearing aid system.

An APP:

In a further aspect, a non-transitory application, termed an APP, is furthermore provided by the present disclosure. The APP comprises executable instructions configured to be executed on an auxiliary device to implement a user interface for a hearing aid or a hearing system described above in the 'detailed description of embodiments', and in the claims. The APP may be configured to run on cellular phone, e.g. a smartphone, or on another portable device allowing communication with said hearing aid or said hearing system. The hearing device may be configured to receive user input from the APP.

Definitions:

In the present context, a hearing aid, e.g. a hearing instrument, refers to a device, which is adapted to improve, augment and/or protect the hearing capability of a user by receiving acoustic signals from the user's surroundings, generating corresponding auditory (e.g., audio) signals, possibly modifying the audio signals and providing the possibly modified audio signals as audible signals to at least one of the user's ears. Such audible signals may e.g. be provided in the form of acoustic signals radiated into the user's outer ears, acoustic signals transferred as mechanical vibrations to the user's inner ears through the bone structure of the user's head and/or through parts of the middle ear as well as electric signals transferred directly or indirectly to the cochlear nerve of the user.

The hearing aid may be configured to be worn in any known way, e.g. as a unit arranged behind the ear with a tube leading radiated acoustic signals into the ear canal or with an output transducer, e.g. a loudspeaker, arranged close to or in the ear canal, as a unit entirely or partly arranged in the pinna and/or in the ear canal, as a unit, e.g. a vibrator, attached to a fixture implanted into the skull bone, as an attachable, or entirely or partly implanted, unit, etc. The hearing aid may comprise a single unit or several units communicating (e.g. acoustically, electrically or optically) with each other. The loudspeaker may be arranged in a housing together with other components of the hearing aid or may be an external unit in itself (possibly in combination with a flexible guiding element, e.g. a dome-like element).

A hearing aid may be adapted to a particular user's needs, e.g. a hearing impairment. A configurable signal processing circuit of the hearing aid may be adapted to apply a frequency and level dependent compressive amplification of an input signal. A customized frequency and level dependent gain (amplification or compression) may be determined in a fitting process by a fitting system based on a user's hearing data, e.g. an audiogram, using a fitting rationale (e.g. adapted to speech). The frequency and level dependent gain may e.g. be embodied in processing parameters, e.g. uploaded to the hearing aid via an interface to a programming device (fitting system) and used by a processing algorithm executed by the configurable signal processing circuit of the hearing aid.

A 'hearing system' refers to a system comprising one or two hearing aids, and a 'binaural hearing system' refers to a system comprising two hearing aids and being adapted to cooperatively provide audible signals to both of the user's ears. Hearing systems or binaural hearing systems may further comprise one or more 'auxiliary devices', which communicate with the hearing aid(s) and affect and/or benefit from the function of the hearing aid(s). Such auxiliary devices may include at least one of a remote control, a remote microphone, an audio gateway device, an entertainment device, e.g. a music player, a wireless communication device, e.g. a mobile phone (such as a smartphone) or a tablet or another device, e.g. comprising a graphical interface. Hearing aids, hearing systems or binaural hearing systems may e.g. be used for compensating for a hearing-impaired person's loss of hearing capability, augmenting or protecting a normal-hearing person's hearing capability and/or conveying electronic audio signals to a person. Hearing aids or hearing systems may e.g. form part of or interact with public-address systems, active ear protection systems, handsfree telephone systems, car audio systems, entertainment (e.g. TV, music playing or karaoke) systems, teleconferencing systems, classroom amplification systems, etc.

BRIEF DESCRIPTION OF DRAWINGS

The aspects of the disclosure may be best understood from the following detailed description taken in conjunction with the accompanying figures. The figures are schematic and simplified for clarity, and they just show details to improve the understanding of the claims, while other details are left out. Throughout, the same reference numerals are used for identical or corresponding parts. The individual features of each aspect may each be combined with any or all features of the other aspects. These and other aspects, features and/or technical effect will be apparent from and elucidated with reference to the illustrations described hereinafter in which:

The figures are schematic and simplified for clarity, and they just show details which are essential to the understanding of the disclosure, while other details are left out. Throughout, the same reference signs are used for identical or corresponding parts.

Further scope of applicability of the present disclosure will become apparent from the detailed description given hereinafter. However, it should be understood that the detailed description and specific examples, while indicating preferred embodiments of the disclosure, are given by way of illustration only. Other embodiments may become apparent to those skilled in the art from the following detailed description.

DETAILED DESCRIPTION OF EMBODIMENTS

The detailed description set forth below in connection with the appended drawings is intended as a description of various configurations. The detailed description includes specific details for the purpose of providing a thorough understanding of various concepts. However, it will be apparent to those skilled in the art that these concepts may be practiced without these specific details. Several aspects of the apparatus and methods are described by various blocks, functional units, modules, components, circuits, steps, processes, algorithms, etc. (collectively referred to as "elements"). Depending upon particular application, design constraints or other reasons, these elements may be implemented using electronic hardware, computer program, or any combination thereof.

The electronic hardware may include micro-electronic-mechanical systems (MEMS), integrated circuits (e.g. application specific), microprocessors, microcontrollers, digital signal processors (DSPs), field programmable gate arrays (FPGAs), programmable logic devices (PLDs), gated logic, discrete hardware circuits, printed circuit boards (PCB) (e.g. flexible PCBs), and other suitable hardware configured to perform the various functionality described throughout this disclosure, e.g. sensors, e.g. for sensing and/or registering physical properties of the environment, the device, the user, etc. Computer program shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise.

The present application relates to the field of hearing aids.

Figure 1A:
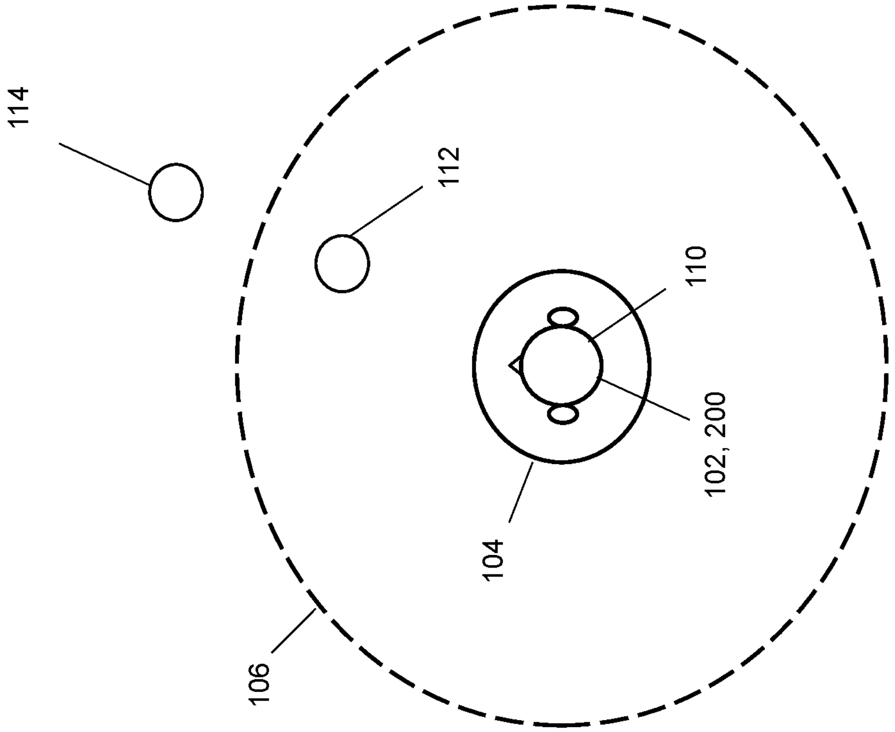
FIGS. 1A-1B show example embodiments of a hearing aid according to the disclosure.

FIG. 1A illustrates an example hearing aid 200 according to the disclosure. In particular, FIG. 1 shows a user 102 wearing a hearing aid 200. The hearing aid 200 can include a distance threshold 104 indicative of a first distance. The hearing aid 200 can optionally include a far-distance threshold 106 indicative of a second distance. As shown in FIG. 1, the distances indicative of the distance parameter 104 and the far-distance parameter 106, respectively, can be circular in shape. However, the shapes may not be circular, and other shapes can be used as well. As an example, the distance threshold 104 can be 1.5 cm from the hearing aid 200.

Figure 1B:
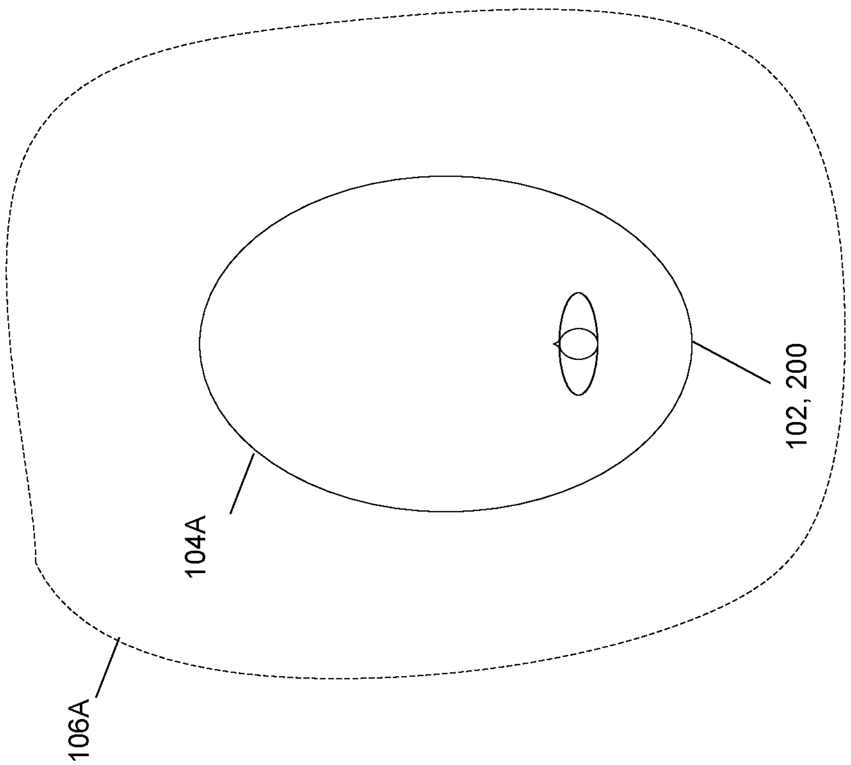

FIG. 1B illustrates an example hearing aid 200 according to the disclosure. As shown, the distance threshold 104A and/or the far-distance threshold 106A can be direction dependent. For example, the distance threshold 104A and/or the far-distance threshold 106A may be shorter behind the user 102 as compared to in front of the user 102.

Figure 2:
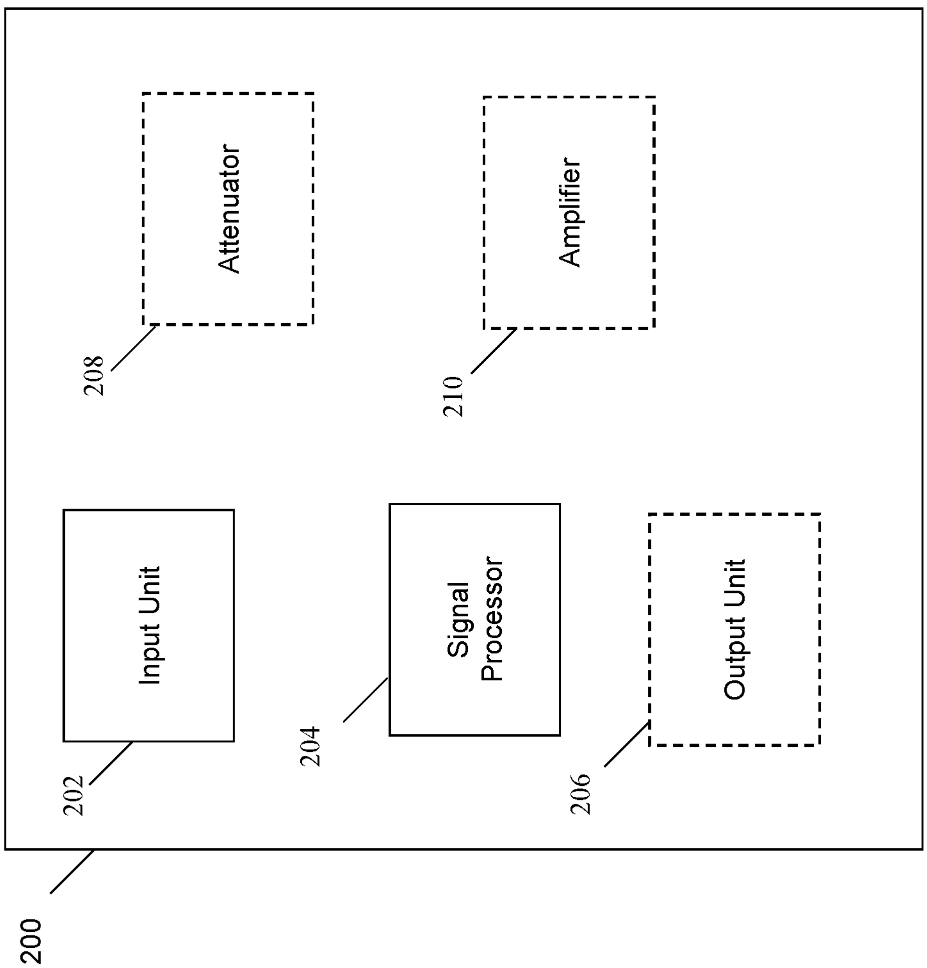
FIG. 2 shows an example embodiment of a hearing aid according to the disclosure.

FIG. 2 illustrates a schematic of an example hearing aid 200 according to the disclosure. As shown, the hearing aid 200 includes an input unit 202. The input unit 202 is configured to convert a sound in an environment of the hearing aid 200 to at least one electrical input signal representative of the sound. The hearing aid 200 further includes a signal processor 204. The signal processor 204 is configured to determine, based on the at least one electrical input signal, whether an origin of the sound is below a distance threshold (e.g., shown as 104 in FIG. 1). In in accordance with the origin being below the distance threshold, the signal processor 204 is configured to attenuate the at least one electrical input signal. For example, the hearing aid 200 may include an attenuator 208. In accordance with the origin being equal to or above the distance threshold, the signal processor 202 is configured to apply an amplification to the at least one electrical input signal, such as via an amplifier 208. In some examples, the signal processor 204 is configured to determine, based on the at least one electrical input signal, whether the origin is above a far-distance threshold 106, and in accordance with the origin being above the far-distance threshold 106, attenuate the at least one electrical input signal. In accordance with the origin being equal to or below the far-distance threshold 106 and being equal to or above the distance threshold 104, the signal processor 204 is configured to not-attenuate the at least one electrical input signal.

The signal processor 204 can determine whether the origin is below the distance threshold 104 by applying one or more of an inter microphone difference, a frequency analysis, a wind noise detection, and an own voice detection. The signal processor 204 can determine whether the origin is above the far-distance threshold 106 by applying one or more of a direct to reverberant ratio, a difference in sound level between microphones of the hearing aid 200, and a noise reduction algorithm Moving back to FIG. 1, illustrated are different origins of sound 110, 112, 114. As shown, the first origin of sound 110 is located on the user 102 of the hearing aid 200, such as when the user 102 is putting on a face mask. As the origin 110 is below the distance threshold 104, the signal processor 204 is configured to attenuate the at least one electrical input signal representative of the sound from the origin 110. Similarly, as the origin 112 is beyond the far-distance threshold 106, the signal processor 204 is configured to attenuate the at least one electrical input signal representative of the sound from the origin 114. In some examples, the signal processor 204 is configured to determine a distance of the origin 110, 112, 114, from the hearing aid 200, wherein to determine whether the origin 110, 112, 114 of the sound is below a distance threshold 104 comprises to determine whether the distance is below the distance threshold 104.

On the other hand, origin 112 is located above the distance threshold 104. Further, if a far-distance threshold 106 is used, the origin 112 is located less than the far-distance threshold 104. Therefore, the signal processor 204 is configured to amplify the at least one electrical input signal representative of the sound from the origin 112. In this way, the hearing aid 200 can aid a user 102 in hearing sounds at a particular distance, therefore improving the user's 102 understanding of sounds in the environment.

The hearing aid 200 can further include an output unit 206, such as a loudspeaker. The output unit 206 configured to output, based on the at least one electrical input signal, an auditory signal.

The hearing aid 200 can be an air-conduction type hearing aid, a bone-conduction type hearing aid, a cochlear implant type hearing aid, or a combination thereof.

Figure 3:
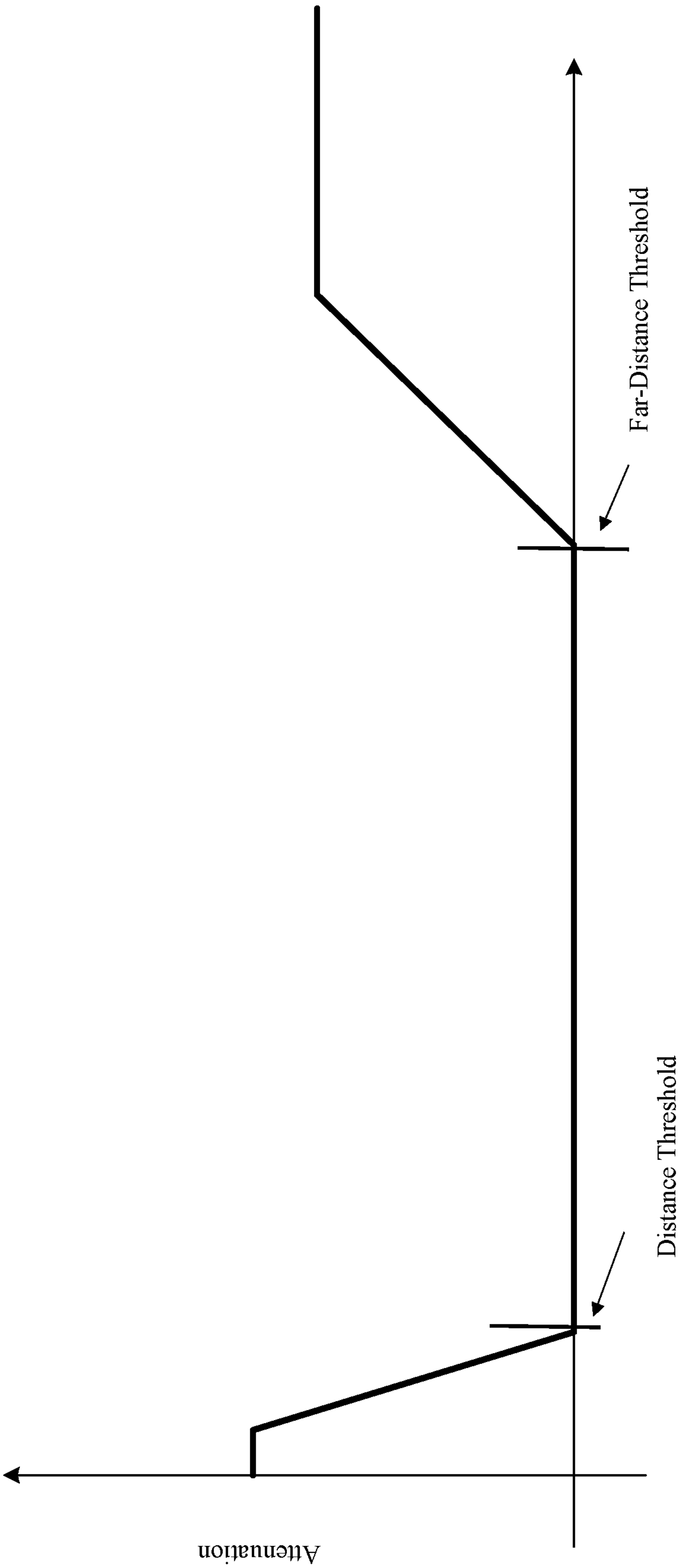
FIG. 3 shows an example gradual distance and far-distance thresholds.

FIG. 3 illustrates an example attenuation for a hearing aid according to the disclosure. As shown, the attenuation may be gradual, rather than abrupt. Therefore, the attenuation may vary depending on how far past the far-distance threshold the origin is and/or how close beyond the distance threshold the origin is. The attenuation rate can be the same for the distance threshold and the far-distance threshold. The attenuation rate can be different for the distance threshold and the far-distance threshold, such as shown in FIG. 3.

Figure 4:
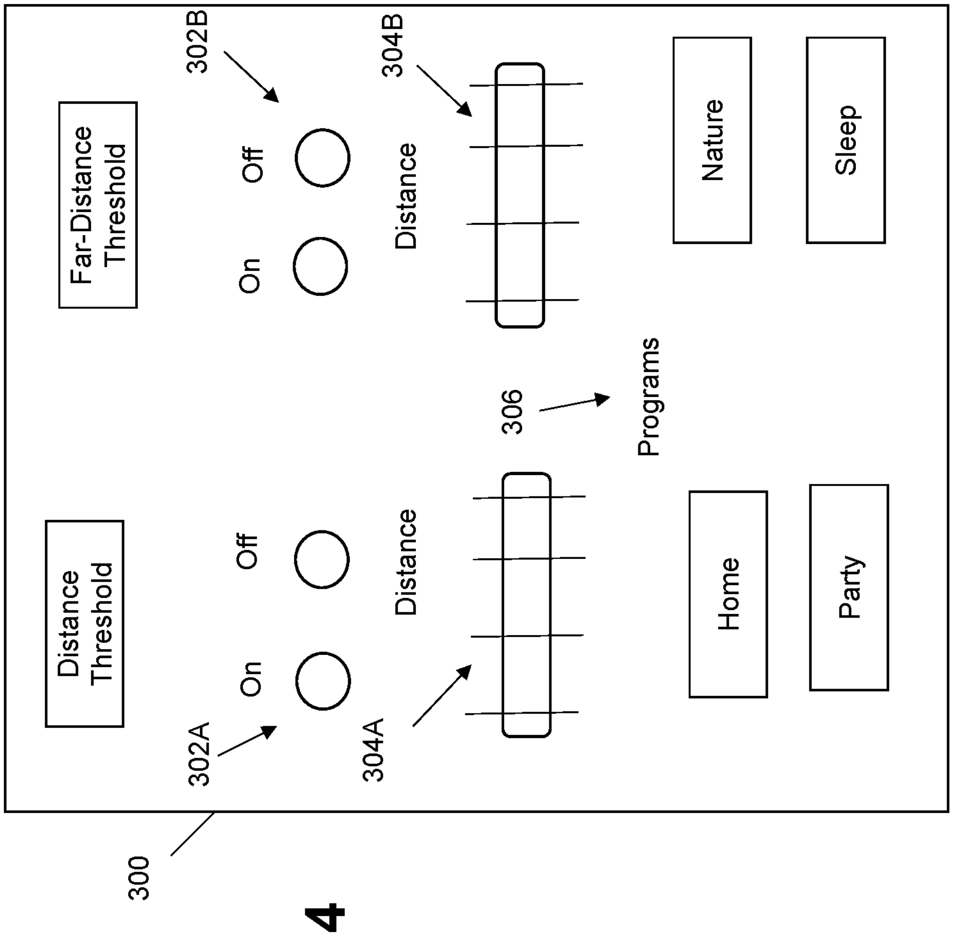
FIG. 4 shows an example embodiment of a mobile device for using a hearing device according to the disclosure.

FIG. 4 illustrates an example auxiliary device, such as a mobile device 300 operating an application (e.g., APP). The hearing aid 200 can be configured to receive user input, and the signal processor 204 is configured to adjust the distance threshold 104 and/or the far-distance threshold 106 based on the user input. The hearing aid 200 can receive user input from an auxiliary device such as mobile device 300.

The mobile device 300 can be in communication with the hearing aid 200, such as via a Bluetooth and/or wireless connection. The mobile device 300 can allow for different user inputs, such as shown. The signal processor 204 can obtain the user input from the mobile device 300. For example, the mobile device 300 can receive user input indicative of whether the distance threshold 104 and/or the far-distance threshold 106 can be enabled or disabled 302A, 302B. Therefore, the hearing aid 200 is configured to enable and/or disable the distance threshold 104. The signal processor 204 can be configured to determine if the at least one electrical input signal is indicative of speech, and in accordance with the at least one electrical input signal being indicative of speech, the signal processor is configured to enable the distance threshold 104.

The hearing aid 200 can be configured to automatically enable and/or disable the distance threshold 104.

Further, the mobile device 300 can receive user input indicative of particular distances for the distance threshold 104 and/or the far-distance threshold 106. While shown as a bar 304A, 304B in FIG. 4, other options can be used, such as receiving numeric values for the distance threshold 104 and/or the far distance threshold 106.

Further, the mobile device 300 can receive user input of different types of programs 306 for the hearing device 200. Upon receiving the user input of different programs, the signal processor 204 can adjust the distance threshold 104 and/or the far-distance threshold 106 automatically based on the user selection.

Figure 5:
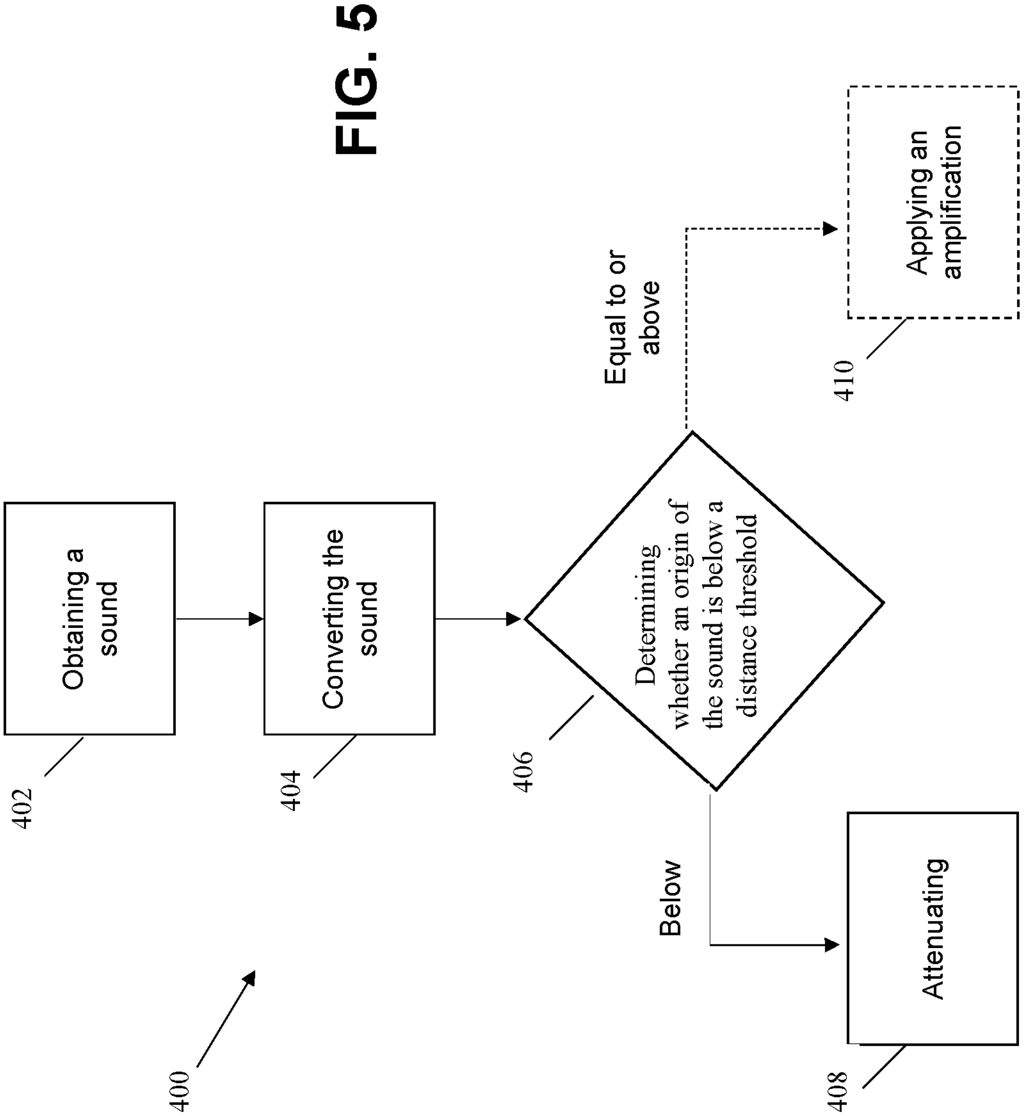
FIG. 5 shows an example method of operating a hearing aid according to the disclosure.

FIG. 5 illustrates an example method 400 of operating a hearing aid according to the disclosure. As shown, the method 400 can include obtaining 402 a sound in an environment. The method 400 can include converting 404 the sound into at least one electrical input signal representative of the sound. The method 400 can include determining 406, based on the at least one electrical input signal, whether an origin of the sound is below a distance threshold. The method 400 can include, in accordance with the origin being below the distance threshold, attenuating 408 the at least one electrical input signal. The method 400 can include, in accordance with the origin being equal to or above the distance threshold, applying 410 an amplification to the at least one electrical input signal.

Further disclosed is a data processing system including a processor and program code means for causing the processor to perform at least some of the steps of the method 400.

Additionally disclosed is computer program product including instructions which, when the program is executed by a computer, cause the computer to carry out the method 400.

Figure 6A:
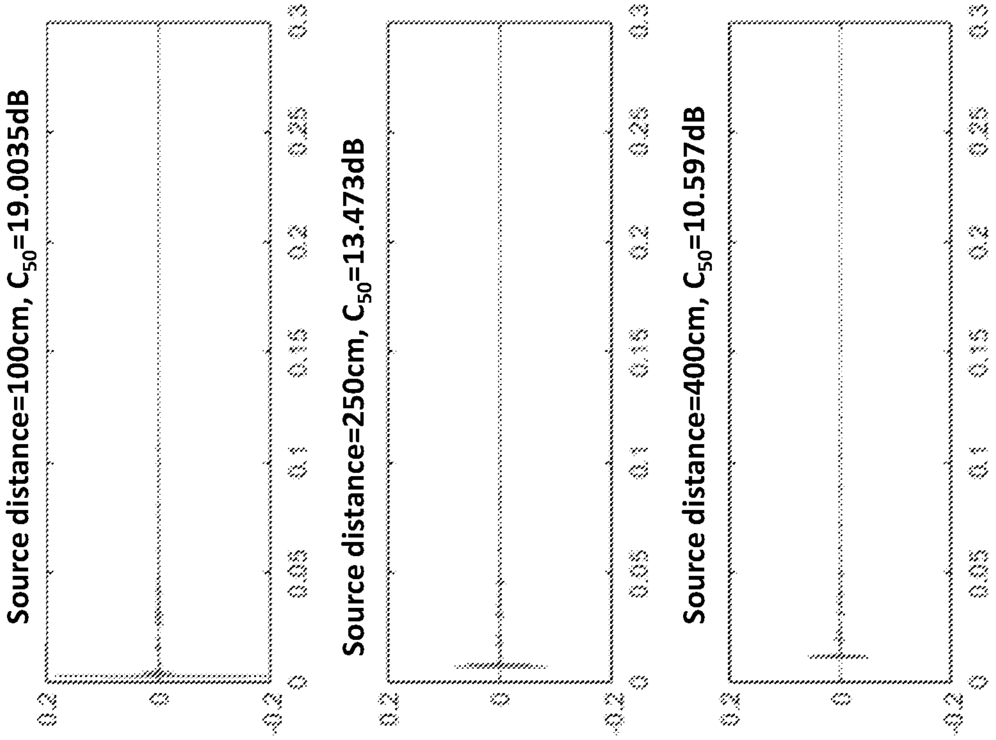
FIGS. 6A-6C illustrate impulse response testing using a hearing aid.
Figure 6B:
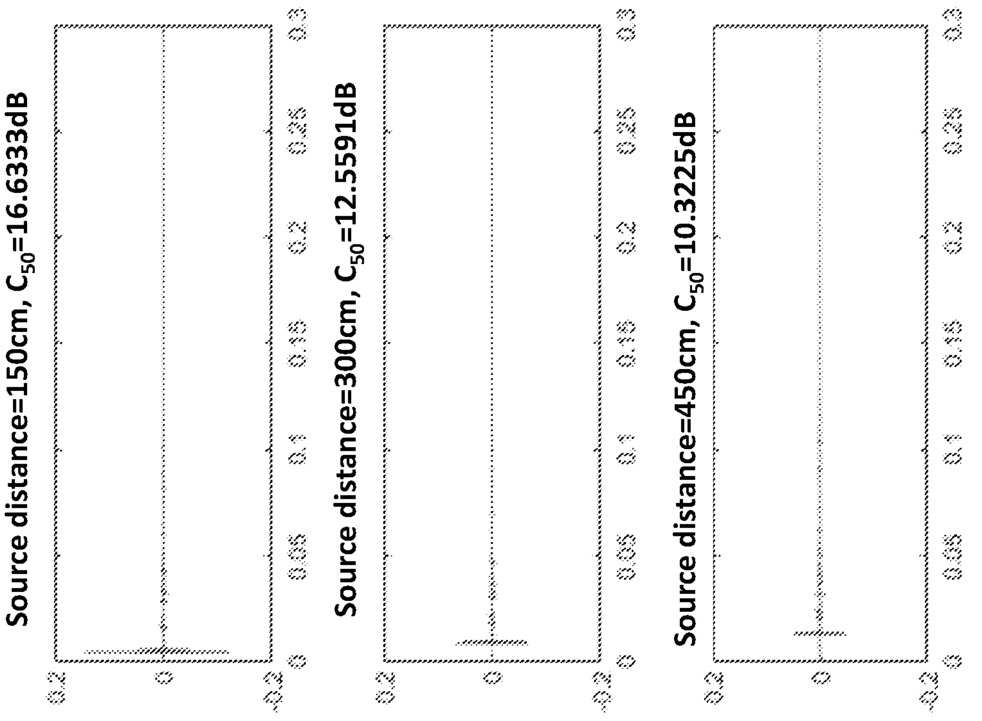
Figure 6C:
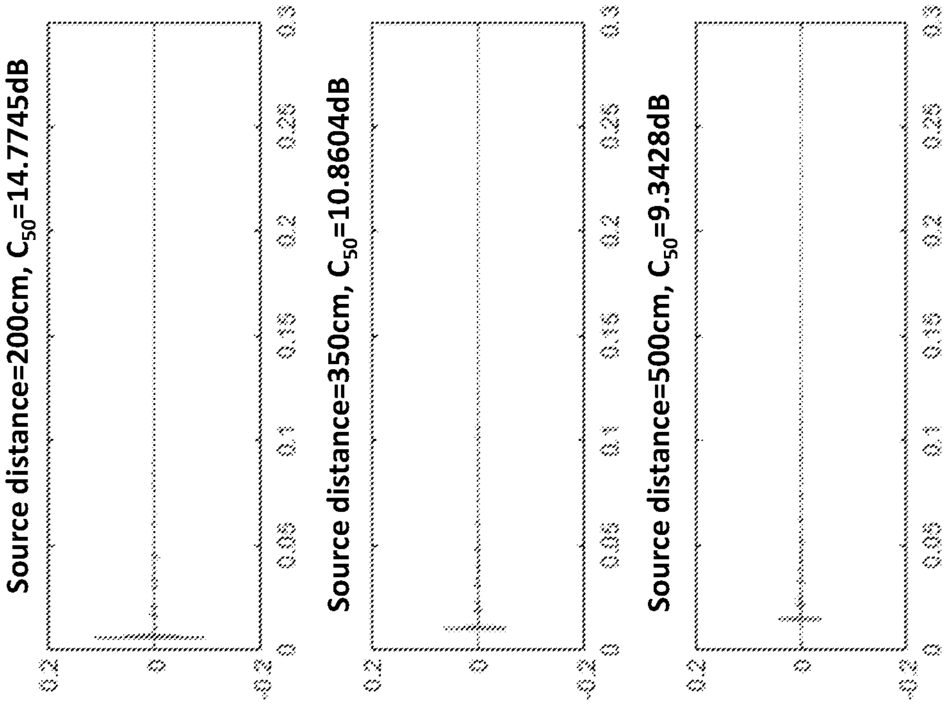

FIGS. 6A-6C illustrate impulse response testing according to an embodiment of a disclosure. The plots of FIGS. 6A-6C show room impulse responses obtained from a specific room, recorded on a hearing aid. The room impulses were obtained from the same direction, but from different loudspeaker distances varying from 100 cm to 500 cm. FIGS. 6A-6C illustrate how a hearing aid can be used to determine a distance to a sound source. For example, FIGS. 6A-6C illustrate how a hearing aid can be used to determine whether an origin of a sound source is above or below a given threshold.

Figure 7A:
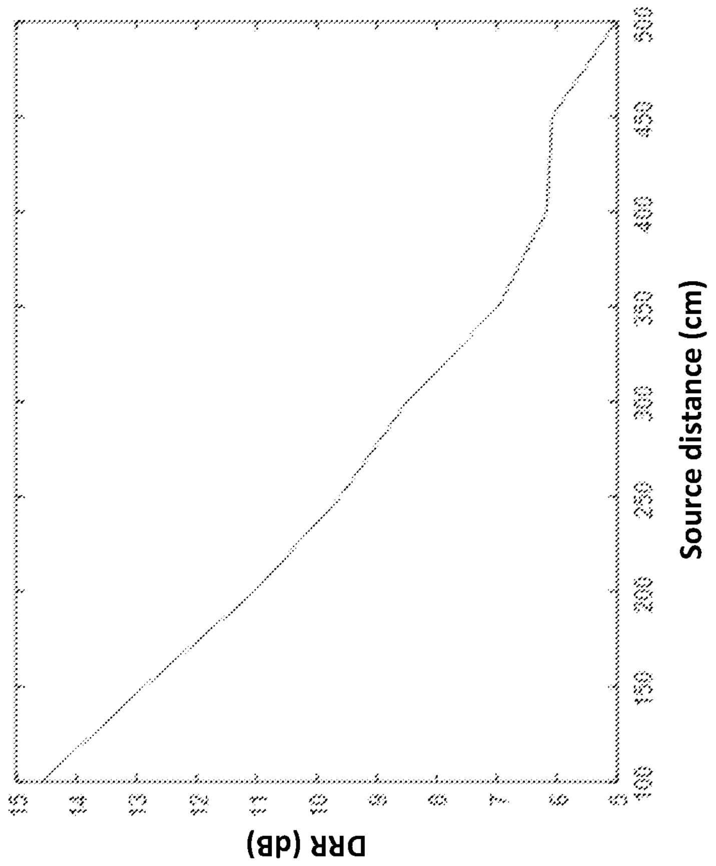
FIGS. 7A-7B illustrate DRR and $D_{50}$ as compared to sound source distances from the testing of FIGS. 6A-6C.
Figure 7B:
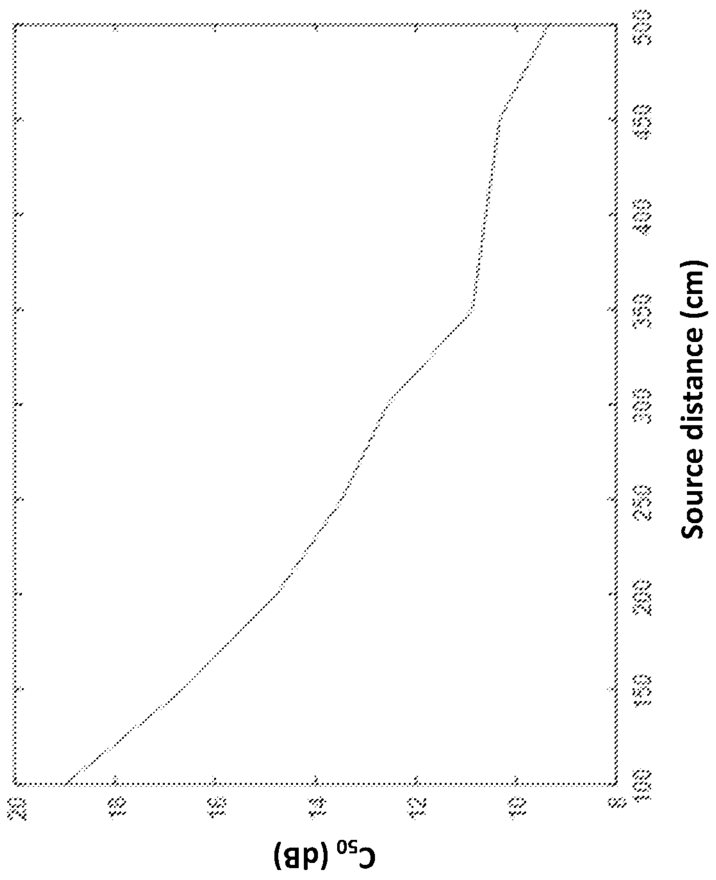

FIGS. 7A-7B illustrate DRR and $D_{50}$ as compared to sound source distances from the testing of FIGS. 6A-6C.

For each impulse response of FIGS. 6A-6C, the direct-to reverberant ratio (DRR) is calculated as the ratio between the magnitude response of the first reflection and the later reflections as shown in FIG. 7A. Further, clarity index may be used, e.g., C50, which is the ratio between the initial 50 milliseconds of the impulse response (after the direct path) and the magnitude response of the remaining tail of the impulse response as shown in FIG. 7B. As can be seen, the C50 decreases with increasing distance. For another room or for another microphone position in the room, the exact values of the DRR may different, but in general it will be seen that the DRR decreases with increasing source distance, and thus it could be used to determine whether a distance threshold is met. The DRR or clarity index may be estimated online, and also different thresholds defining what is part of the direct part and what belongs to the tail may be selected (for example 2 ms 10 ms, 15 ms, 30 ms, 40 ms or 50 ms). Further details can be found with respect to DRR in the article Direct-to-Reverberant Energy Ratio Estimation using a First Order Microphone by Hanchi Sing (2016), hereby incorporated by reference in its entirety.

FIGS. 7A-7B illustrate how a hearing aid can be used to determine a distance to a sound source. For example, FIGS. 7A-7B illustrate how a hearing aid can be used to determine whether an origin of a sound source is above or below a given threshold.

It is intended that the structural features of the devices described above, either in the detailed description and/or in the claims, may be combined with steps of the method, when appropriately substituted by a corresponding process.

As used, the singular forms "a," "an," and "the" are intended to include the plural forms as well (i.e. to have the meaning "at least one"), unless expressly stated otherwise. It will be further understood that the terms "includes," "comprises," "including," and/or "comprising," when used in this specification, specify the presence of stated features, integers, steps, operations, elements, and/or components, but do not preclude the presence or addition of one or more other features, integers, steps, operations, elements, components, and/or groups thereof. It will also be understood that when an element is referred to as being "connected" or "coupled" to another element, it can be directly connected or coupled to the other element, but an intervening element may also be present, unless expressly stated otherwise. Furthermore, "connected" or "coupled" as used herein may include wirelessly connected or coupled. As used herein, the term "and/or" includes any and all combinations of one or more of the associated listed items. The steps of any disclosed method are not limited to the exact order stated herein, unless expressly stated otherwise.

It should be appreciated that reference throughout this specification to "one embodiment" or "an embodiment" or "an aspect" or features included as "may" means that a particular feature, structure or characteristic described in connection with the embodiment is included in at least one embodiment of the disclosure. Furthermore, the particular features, structures or characteristics may be combined as suitable in one or more embodiments of the disclosure. The previous description is provided to enable any person skilled in the art to practice the various aspects described herein. Various modifications to these aspects will be readily apparent to those skilled in the art, and the generic principles defined herein may be applied to other aspects.

The claims are not intended to be limited to the aspects shown herein but are to be accorded the full scope consistent with the language of the claims, wherein reference to an element in the singular is not intended to mean "one and only one" unless specifically so stated, but rather "one or more." Unless specifically stated otherwise, the term "some" refers to one or more.

The invention claimed is:

1. A hearing aid comprising:

an input unit configured to convert a sound in an environment of the hearing aid to at least one electrical input signal representative of the sound; and a signal processor configured to:

determine, based on the at least one electrical input signal, whether an origin of the sound is below a distance threshold; and in accordance with the origin being below the distance threshold, attenuate the at least one electrical input signal;

wherein the signal processor is further configured to:

determine, based on the at least one electrical input signal, whether the origin is above a far-distance threshold; and in accordance with the origin being above the far-distance threshold, attenuate the at least one electrical input signal.

2. The hearing aid according to claim 1, wherein in accordance with the origin being equal to or above the distance threshold, the signal processor is configured to apply an amplification to the at least one electrical input signal via an amplifier.

3. The hearing aid according to claim 1, wherein the signal processor is configured to determine a distance of the origin from the hearing aid, wherein to determine whether the origin of the sound is below a distance threshold comprises to determine whether the distance is below the distance threshold.

4. The hearing aid according to claim 1, wherein the distance threshold is 1.5 cm from the hearing aid.

5. The hearing aid according to claim 1, wherein in accordance with the origin being equal to or below the far-distance threshold and being equal to or above the distance threshold, the signal processor is configured to not-attenuate the at least one electrical input signal.

6. The hearing aid according to claim 1, wherein to determine whether the origin is above the far-distance threshold comprises applying one or more of a direct to reverberant ratio, a difference in sound level between microphones of the hearing aid, and a noise reduction algorithm.

7. The hearing aid according to claim 1, wherein the hearing aid is configured to receive user input, and wherein the signal processor is configured to adjust the distance threshold and/or the far-distance threshold based on the user input.

8. The hearing aid according to claim 1, wherein the hearing aid further comprises an output unit configured to output, based on the at least one electrical input signal, an auditory signal.

9. The hearing aid according to claim 1, wherein to determine whether the origin is below the distance threshold comprises applying one or more of an inter microphone difference, a frequency analysis, a wind noise detection, and an own voice detection.

10. The hearing aid according to claim 1, wherein the hearing aid is configured to enable and/or disable the distance threshold.

11. The hearing aid according to claim 10, wherein the signal processor is configured to determine if the at least one electrical input signal is indicative of speech; and in accordance with the at least one electrical input signal being indicative of speech, the signal processor is configured to enable the distance threshold.

12. The hearing aid according to claim 1, the hearing aid being constituted by or comprising an air-conduction type hearing aid, a bone-conduction type hearing aid, a cochlear implant type hearing aid, or a combination thereof.

13. A method of operating a hearing aid, the method comprising:

obtaining a sound in an environment;

converting the sound into at least one electrical input signal representative of the sound;

determining, based on the at least one electrical input signal, whether an origin of the sound is below a distance threshold;

in accordance with the origin being below the distance threshold, attenuating the at least one electrical input signal;

determining, based on the at least one electrical input signal, whether the origin is above a far-distance threshold; and in accordance with the origin being above the far-distance threshold, attenuate the at least one electrical input signal.

* * * * *